June 13, 1939.  R. H. BEEBE  2,162,498
MACHINE FOR AND METHOD OF WINDING HEADLIGHT COILS
Original Filed Sept. 7, 1935  7 Sheets-Sheet 1
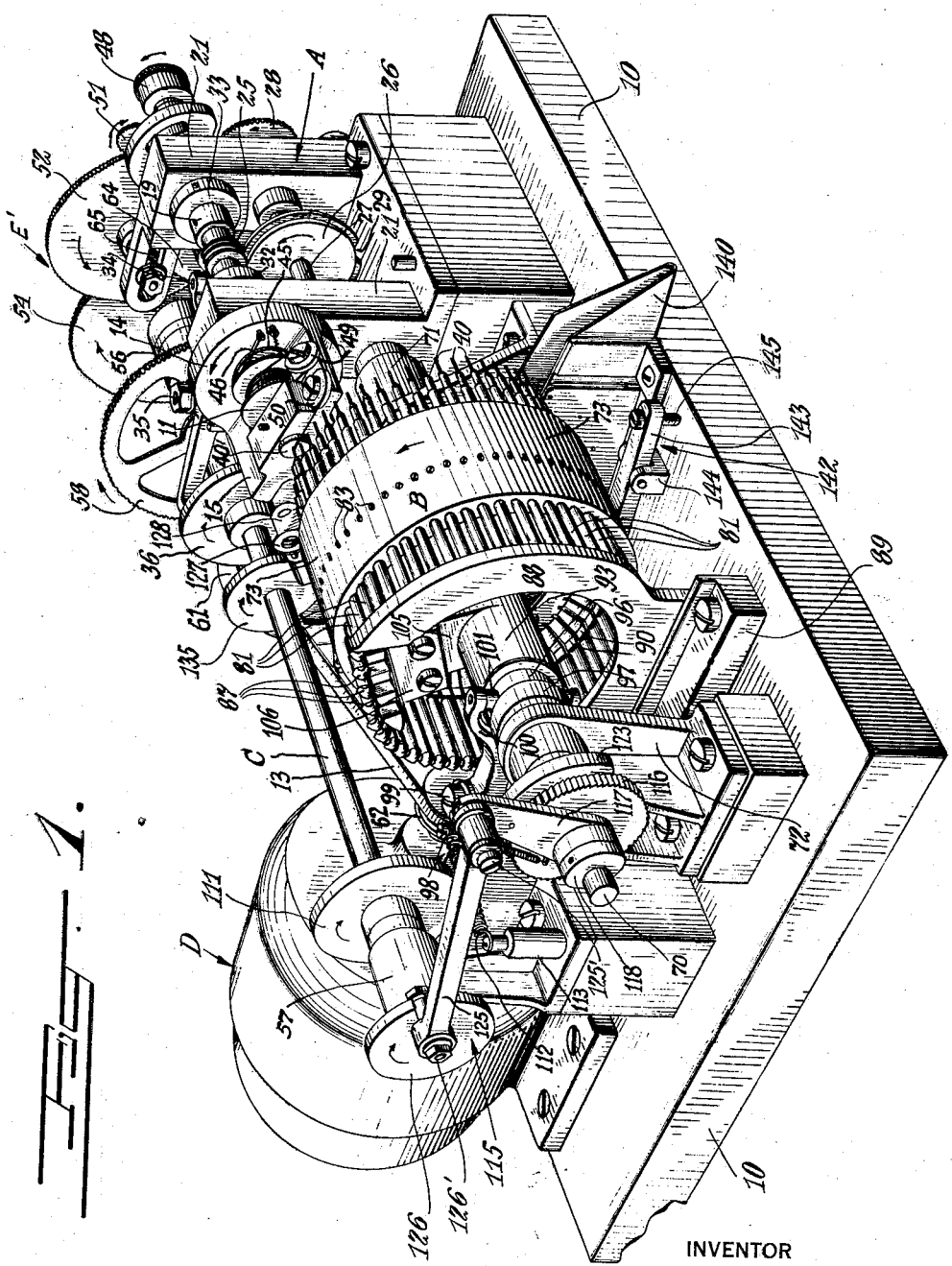
INVENTOR
R. H. BEEBE.
BY
ATTORNEY

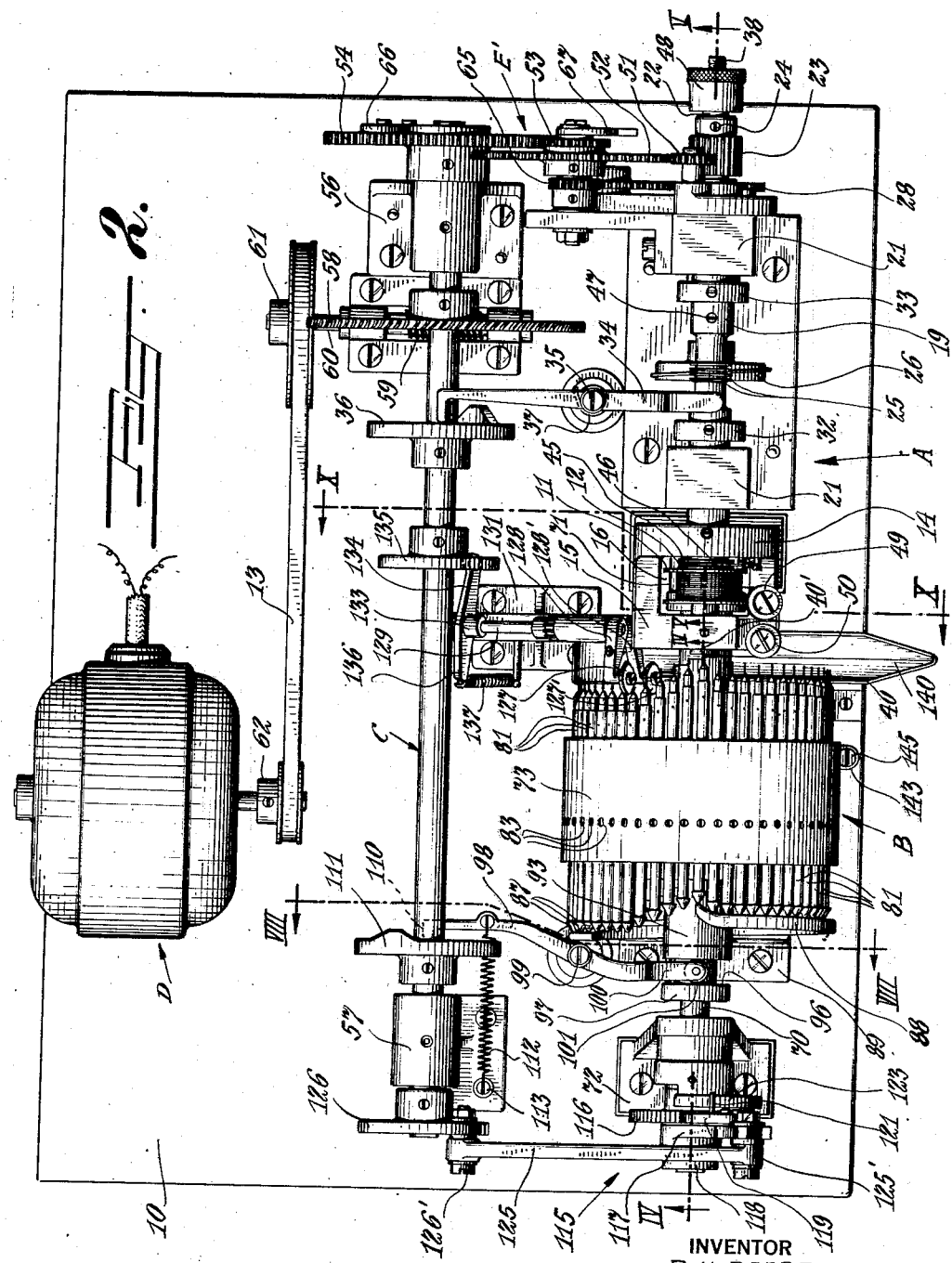

June 13, 1939.   R. H. BEEBE   2,162,498
MACHINE FOR AND METHOD OF WINDING HEADLIGHT COILS
Original Filed Sept. 7, 1935   7 Sheets-Sheet 3
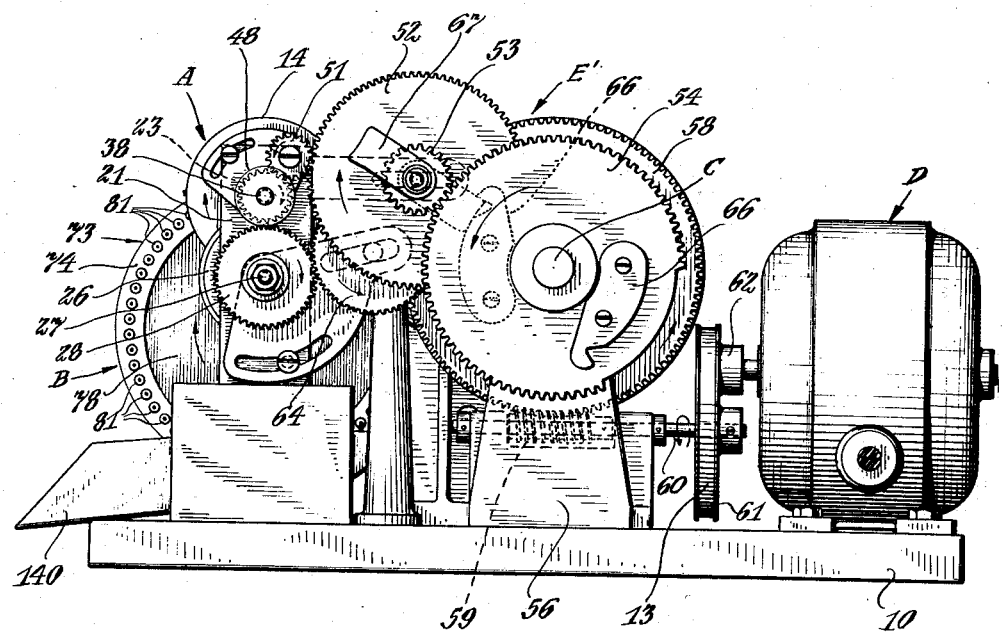
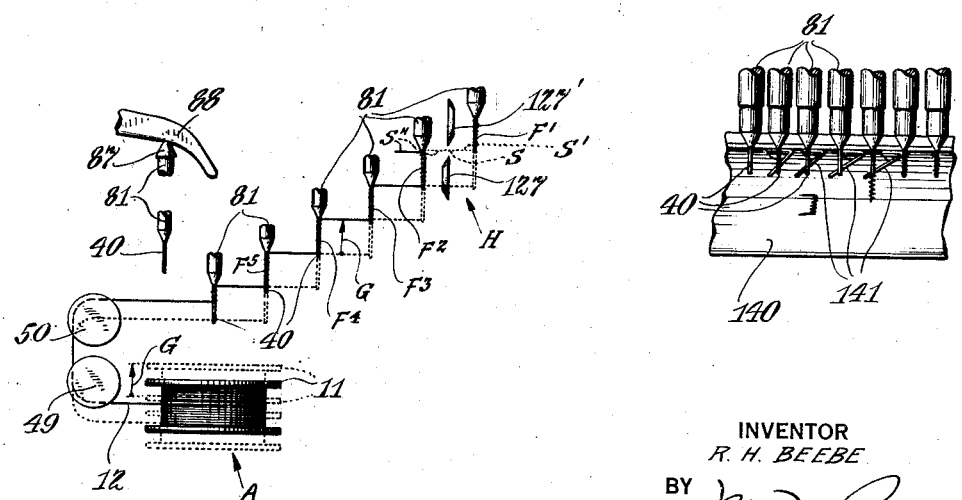
INVENTOR
R. H. BEEBE
BY
ATTORNEY

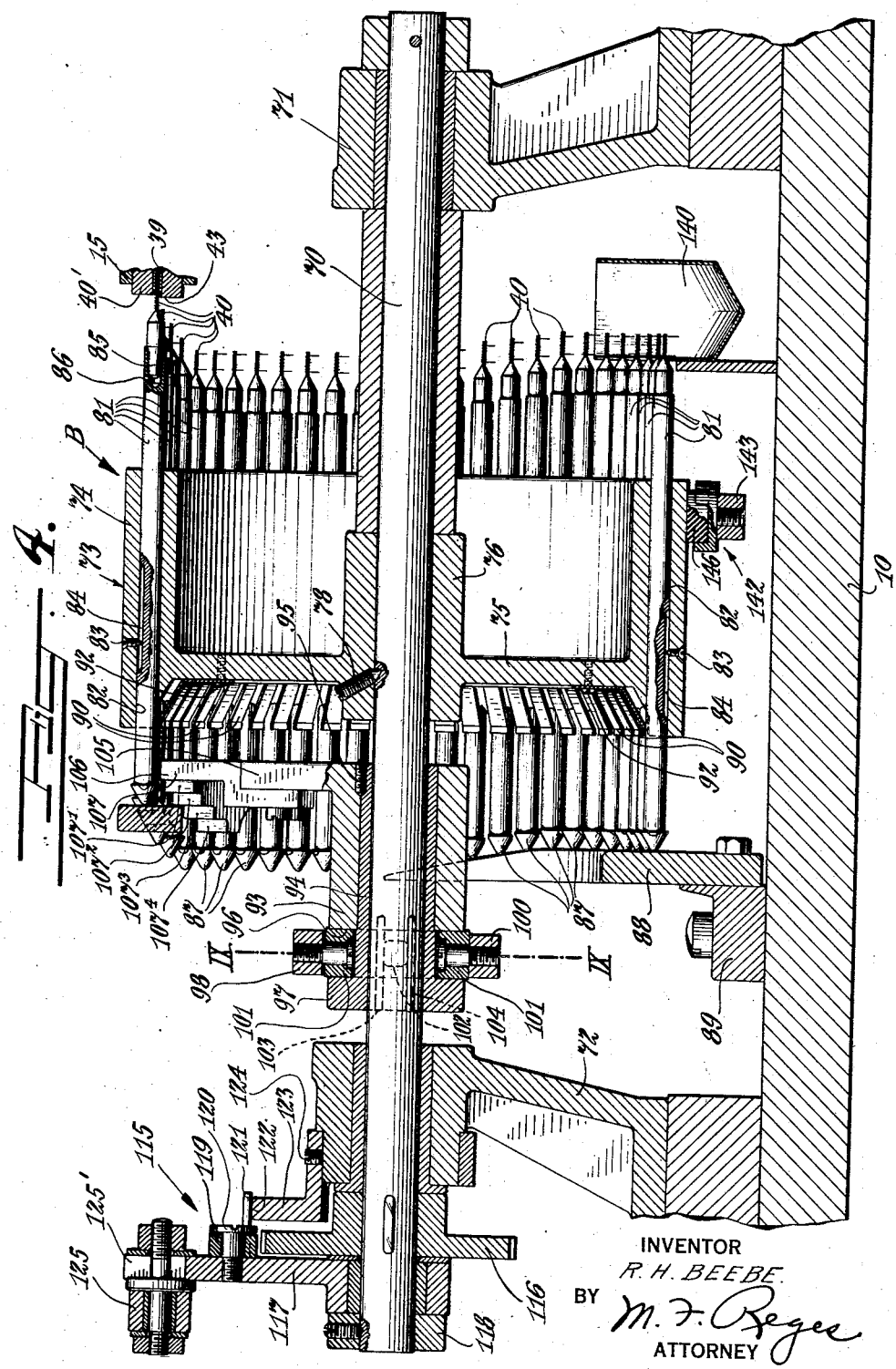

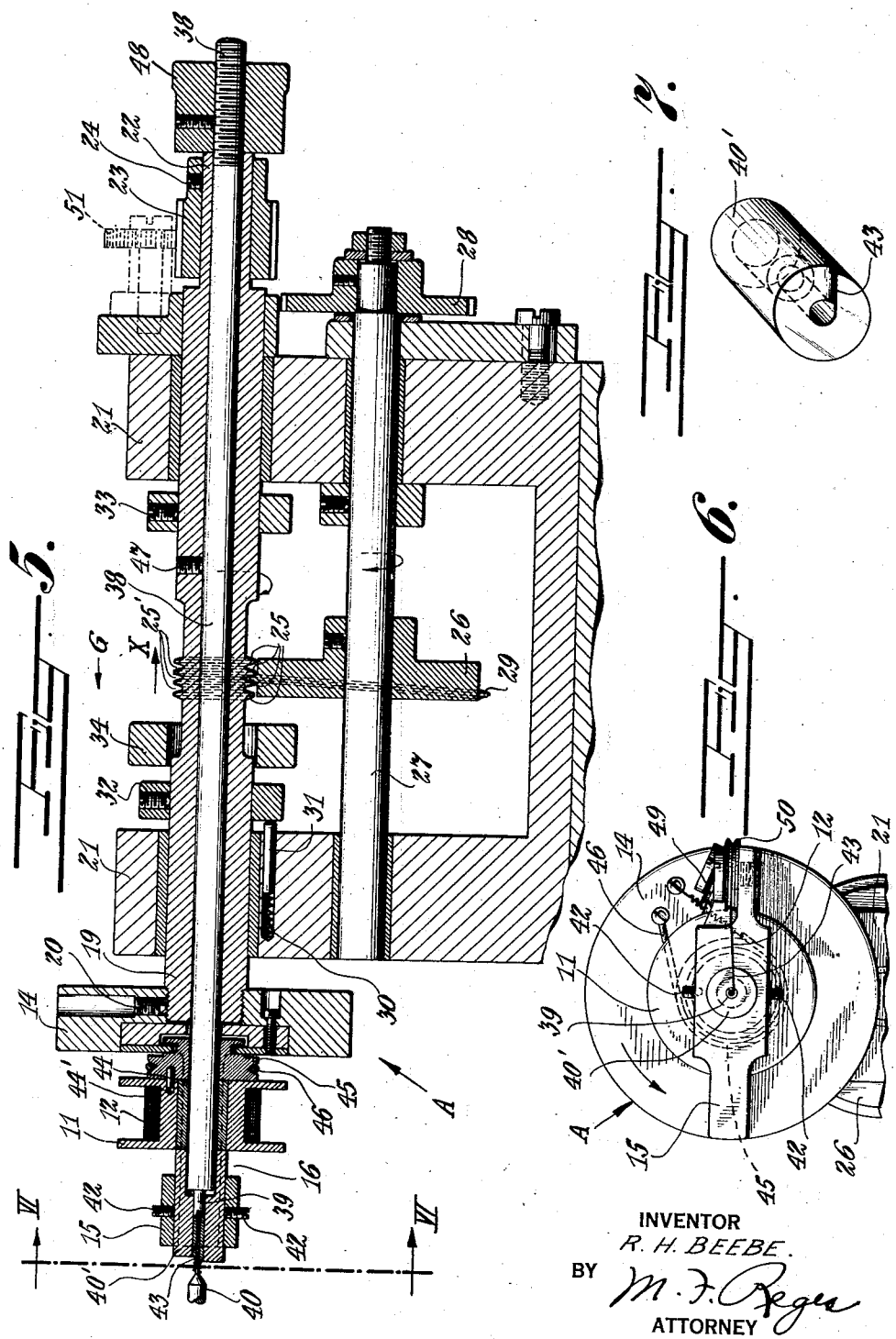

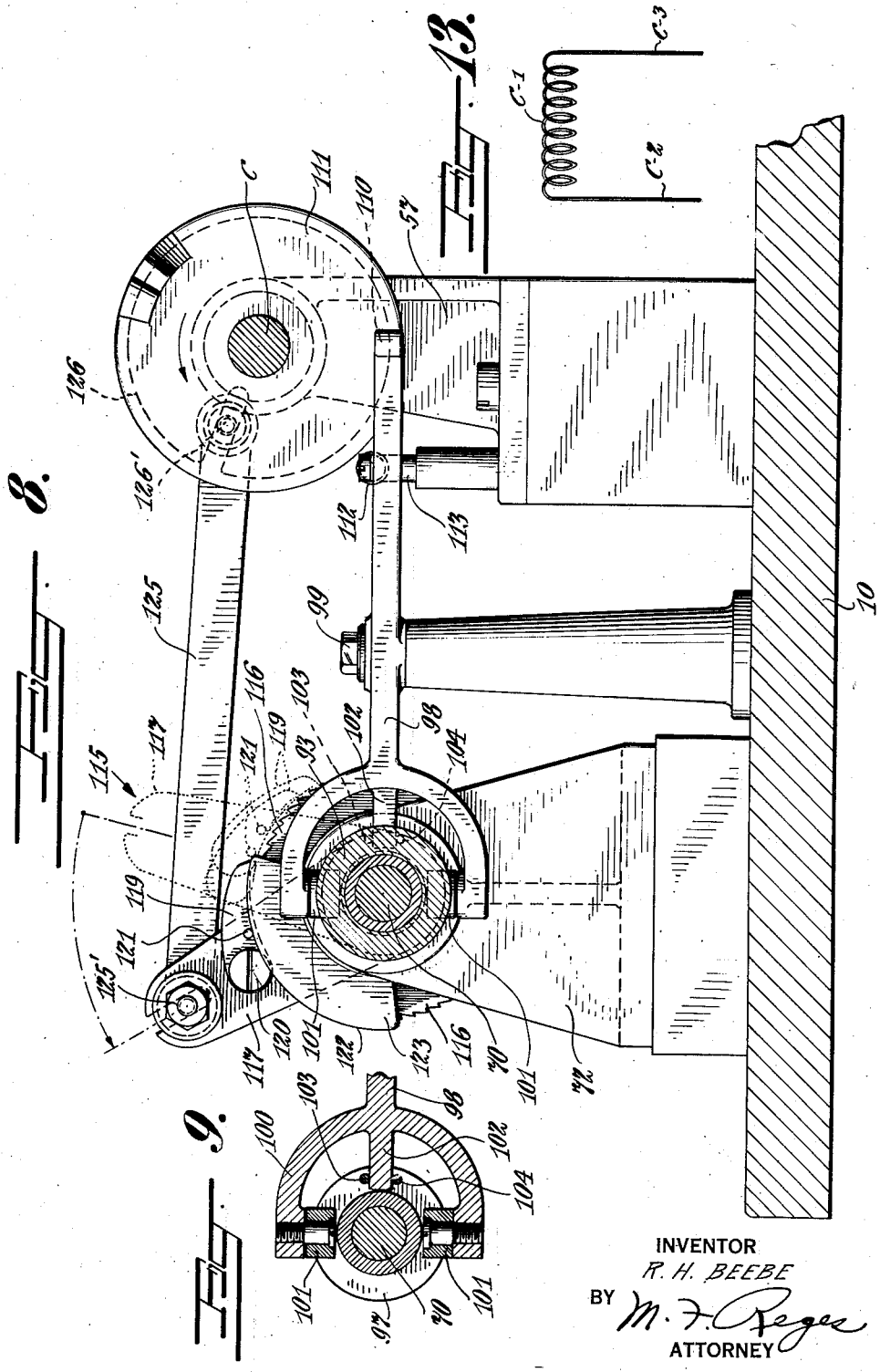

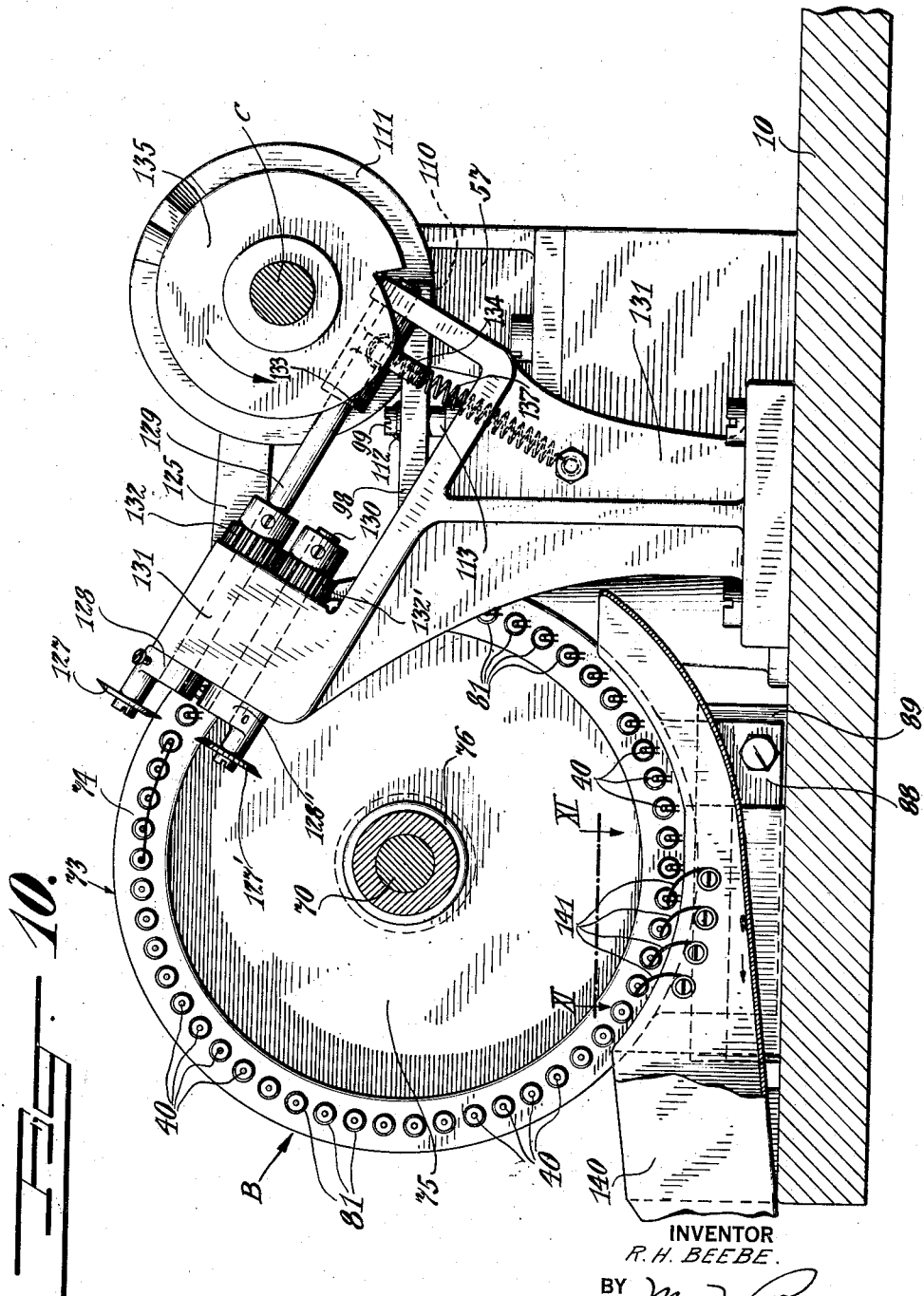

Patented June 13, 1939

2,162,498

UNITED STATES PATENT OFFICE 2,162,498

MACHINE FOR AND METHOD OF WINDING HEADLIGHT COILS

Raymond H. Beebe, Bridgeport, Conn., assignor, by mesne assignments, to Westinghouse Electric and Manufacturing Company, East Pittsburgh, Pa., a corporation of Pennsylvania Application September 7, 1935, Serial No. 39,530
Renewed November 19, 1938

23 Claims. (Cl. 153—67)

The present invention relates to the manufacture of incandescent electric lamps and more particularly to the production of coiled lamp filaments.

In certain types of incandescent electric lamps, as for example miniature lamps such as used for automobile headlights, it is necessary to form a tungsten wire into a very small coil and, for the purpose of facility in the mounting of these coils in a lamp, it is desirable to position the ends or terminals in definite relation to the coiled section.

Heretofore various devices were used to bend the ends of the wires to position, this shaping or bending being performed in a fixture or jig after the coils were wound. When large size coils are used, as in large lamps, the separate bending operation can be performed with reasonable accuracy, although the operation is difficult and time consuming.

The present invention provides a machine for automatically winding small coiled filaments, each coil being connected by a straight portion and in so arranging the machine elements and the operation of the machine that the coiled sections are severed and at the same time each terminal takes a definite predetermined position relative to the coiled section.

An object of the invention is to provide a high speed coil making machine.

Another object of the invention is to provide a machine for automatically holding one coil during the winding of another coil while the coils are connected by an uncoiled portion and in severing the uncoiled portion intermediate the coiled sections.

A further object of the invention is to provide a method of manufacturing coiled sections with terminal members disposed in predetermined positions.

A still further object of the invention is to provide a machine for successively winding coiled sections on individual mandrels and in maintaining the coils connected by straight portion of wire during the coiling operation.

Other objects and advantages of the invention will be more fully understood from the following description together with the accompanying drawings in which Fig. 1 is a perspective view of a machine embodying the present invention;

Fig. 2 is a plan view of the machine shown in Fig. 1;

Fig. 3 is a side elevational view of the machine illustrating the change gear assembly and motor drive;

Fig. 4 is a vertical cross sectional view taken on line IV—IV of Fig. 2 and showing the mandrel drum assembly;

Fig. 5 is a vertical cross sectional view on line V—V of Fig. 2 showing the coil winding head assembly and part of its driving means;

Fig. 6 is a side elevational view on line VI—VI of Fig. 5 showing the front view of the coil-winding head;

Fig. 7 is a perspective view of a detail of the coil-winding head;

Fig. 8 is a cross sectional view on line VIII—VIII of Fig. 2 showing again the indexing means for the mandrel drum;

Fig. 9 is a cross sectional view on line IX—IX of Fig. 4;

Fig. 10 is a cross sectional view on line X—X of Fig. 2 showing the coil cutting assembly;

Fig. 11 is a plan view in the direction of the arrow XI—XI of Fig. 10 illustrating the removing of the finished and cut coils from the mandrels;

Fig. 12 is a diagrammatic view, picturing the various steps of operations to produce filamentary coils of the desired character and quality; and Fig. 13 is an enlarged view of a finished coil in the shape as discharged from the machine.

The selected embodiment of the present invention, as shown and described, may comprise a plurality of co-related machine elements, mounted upon a suitable base 10, to perform a coil winding operation to produce sections C—1 of helically wound wire for lamp filaments having terminals C—2 and C—3 in the form of straight portions of wire extending substantially at right angles to the longitudinal axes of the coils.

As above mentioned, coils of the same general shape and form as disclosed herein were heretofore made on a lathe and wound on a continuous mandrel by a highly skilled operator. After one coil was finished, cut off, and removed from the mandrel, the filament wire end of the spool had to be gripped either manually or by a chuck automatically to hold the same in a definite locked position, before the next coiling could be started and, obviously, the operation was laborious and expensive.

Coils produced by a machine constructed in accordance with the present invention are not immediately cut off after the coil is finished, but the finished coil is utilized as a chuck to hold the wire in proper locked position for the formation of the succeeding coil, giving a series of coils connected by uncoiled or straight portions. The cutting off or separation of the individual coil is accomplished after a plurality of coils have been formed.

Machines have been used in which a single mandrel was employed and as soon as a coil was wound it was stripped off. Since it is necessary to produce coils in quick succession and in great numbers, the use of a single mandrel resulted in rapid wear. In the manufacture of lamp filaments it is essential to maintain the coil diameters uniform and in machines in which a single mandrel was employed the wear on the mandrel would gradually reduce the mandrel size, changing the diameter of the coiled wire. It was, therefore, necessary to change mandrels frequently and carefully check for variation in size before any appreciable amount of coils were produced that were not within the dimension limits set down by the rating standard.

In the present machine fifty-four mandrels are used in succession, which means that fifty-four times as many coils can be produced before an exchange of mandrels is necessary. It will be evident that the present invention not only increases the quantity of the coils produced, but reduces the number of imperfect coils to a practical minimum.

As shown more clearly in Figs. 1, 2 and 3, the present machine includes several units which will be first indicated by reference characters for the sake of clearness.

A represents a coil-winding head assembly, which carries a spool 11 for filamentary wire 12, more fully described hereinafter.

B shows what may be termed a mandrel drum assembly or carrier. The winding head assembly A and the mandrel drum assembly B are driven by a common main driving shaft C which in turn is driven by means of gearing and a belt 13 leading to the shaft by an electric motor D or any other suitable means.

Referring to the winding head assembly A, and particularly to Figs. 1, 2, 3 and 5, it will be noted that this unit comprises a carrier plate 14 and integral flat extension or shelf 15. This shelf 15 has a rectangular aperture 16 to receive a spool 11. The carrier plate 14 is secured to a hollow shaft 19 by a set screw 20. Hollow shaft 19 is journalled in bearings 21 which latter are secured by screws to the base plate 10. At the other end 22 of hollow shaft 19 is a pinion 23 secured by a set screw 24, to be driven by a set of change gears indicated as a whole by the reference character E' and to be later described.

Substantially midway between the ends of shaft 19 are provided a plurality of rings 25 to provide annular grooves 25' to receive a cam in the form of a worm gear 26 attached by a set screw to a countershaft 27. This shaft is positioned below shaft 19 and journalled in bearings 21. Secured to one end of shaft 27 is a spur gear 28 disposed in mesh with one of the gear wheels of the change gears E' (see Figs. 2 and 5).

It will be understood that the present machine is constructed to wind filaments such as shown in Fig. 13. These filaments are exceedingly small; for example, a coil of the type as used for an automobile headlight may include twelve and one half turns of tungsten wire of .0065 of an inch diameter. The coiled section C—1 may have an outside diameter of .0366 of an inch and, as shown, the terminals C—2 and C—3 should extend in the form of straight wire from the opposite sides of the coiled section in a direction substantially perpendicular to the axis of the coil. Furthermore, it is essential to control the length of the coil so that the terminals of each coil will be spaced a predetermined distance apart. This is important to obtain accuracy in mounting the coil on a lamp mount.

As will be later described, the winding head A operates to wind the coiled section C—1 and the length of the coil to be wound is controlled by the worm or cam 26. The cam 26 consists of a single tooth or thread having a pitch equal to the exact length of the filamentary coil to be wound and is provided with a notch 29 (see Fig. 1), at the beginning and end of the tooth, of sufficient size to clear the rings 25 when the opening 29 is at the top or when a coil has been wound.

The hollow coil winding shaft 19 is movable endwise and is under constant spring pressure by means of a spiral spring 30 which normally urges the shaft in the direction of the arrow X. The said spring is encased in bearing 21 and a pin 31, pressing against an adjustable collar 32, secured to the hollow shaft 19, serves to move the shaft in the direction above indicated. Another collar 33 is attached to the hollow shaft 19 to limit its endwise movement under the action of the spring 30.

The coil winding shaft is returned to its initial position by means of a rocker arm 34, (see Fig. 2) pivoted at 35 to the base plate 10. One end of the arm 34 engages a cam 36 on shaft C and is held in contact therewith by means of a spiral spring 37. The other end of the arm 34 is forked and extends over a portion of the hollow shaft 19 between collar 32 and the rings 25. A more detailed description of the operation of these parts will be given hereinafter.

The hollow shaft 19 carries an inner shaft 38 which extends from both ends of the shaft 19 (see Fig. 5). The left end 39 of shaft 38 is reduced to a smaller diameter and has a recess to freely receive the end of a mandrel 40. As shown in Fig. 5, mandrel 40 is one of fifty-four mandrels mounted on the carrier or conveyor B termed a mandrel drum and will be more fully described later.

The end 39 of shaft 38 extends into a hollow stub shaft or bushing 40'. This bushing is also formed to receive the reduced end of shaft 38, and is held in a cylindrical opening or bore provided in the extension 15 by set screws 42. The hollow shaft 40' has an extension or ledge 43 (see Fig. 7) slightly wider than the diameter of the filamentary wire 12. This ledge is formed with a concave surface to hold the wire during winding and thus guide the filament wire about a mandrel 40, the wire being led from the spool 11 by means of guide pulleys, which will be described later.

The spool 11 has in its face a hole 44' to receive a pin 44 attached to a brake pulley 45. A light cable and spring 46 attached to the face of the carrier plate 14 serve as a brake band on the pulley 45, thus creating the required tension so that the spool will not rotate faster than required. This tensioning means is of advantage in varying the tension of the wound wire and it has been found that with wire of different properties it is possible to control to an appreciable degree the resultant position of the legs or terminals with relation to the coiled section. For example, if the wire employed does not have sufficient inherent spring to cause the terminals to take their required position an adjustment of the tensioning means serves to bring about the required condition or approach the exactness desired in the positions of the legs or terminals on the finished coils.

When a new spool of wire is to be inserted a screw 47, which locks shaft 38 to hollow shaft 19, is first loosened. Shaft 38, which has on its right end a knob 48 to serve as a stop, may then be removed until it clears spool 11. Set screws 42 are then loosened permitting hollow shaft 40' to be moved to the left to free spool 11 from its connection with brake pulley 45. The empty spool 11 may then be removed and a new spool inserted. The wire is carried from the spool 11 over pulleys 49 and 50 attached to coil head extension or shelf 15, then over to ledge 43 and on to a mandrel.

The entire machine is driven from power furnished by the motor D and the motion transmitting mechanism is more clearly shown in Figs. 2 and 3. The coil winding shaft 19 is provided with a pinion 23 driven by change gears 51, 52, 53 and gear segment 54, which latter is attached to drive shaft C. This shaft is journalled in two bearings 56 and 57, secured to base plate 10 and extends over nearly the whole length of the base plate. A number of cams are mounted on this shaft C in their proper places for purposes to be described later.

Shaft C is connected with motor D by means of a worm wheel 58 suitably secured to the said shaft and driven by a worm 59 secured to a worm shaft 60. A pulley 61 is attached to the shaft 60 and is driven by means of the belt 13 leading to a pulley 62 on the shaft of motor D.

As above pointed out the coil length control shaft 27, which carries cam 26, has the spur gear wheel 28 which is driven by change gears 64, 65, 53 and gear segment 54 (see Figs. 2 and 3). A locking and starting plate 66 is fastened to the outer face of gear segment 54 to engage a locking member 67, attached to gear 53. This serves to keep shafts 19 and 27 in a firm locked position during a given time interval required in the operation of the machine and which is approximately one-fifth of the time required for a complete coiling operation, as one revolution of the shaft C corresponds to exactly one coiling operation.

The mandrel drum assembly B is provided with a shaft 70 aligned with the coiling head assembly A. See Figs. 1, 2, 4, 8, 9 and 10. The shaft 70 is journalled in bearings 71 and 72 which are suitably secured to base plate 10.

The mandrel assembly includes a drum casing 73, comprising an outer ring 74, an inner wall 75 and a hub 76. This hub is fastened by set screw 78 to shaft 70. The outer ring 74 of the drum casing 73 is provided with a plurality of holders 81 for mandrels 40. The holders are slidable in passages 82 formed in the ring 73 and disposed in parallel spaced relation around and adjacent to the outer surface of the ring. Small screws 83 slide in grooves 84 and prevent the holders 81 from turning, the grooves being of sufficient length to permit holders to move a given distance in the direction of their longitudinal axes.

Each of the fifty-four mandrels employed is provided with a tapered shank 85 which fits a tapered aperture at the end of each holder and, obviously, fifty-four mandrel holders are required. The pitch or the distance between these holders is equal to twice the length of one filamentary coil leg C—2 or C—3 so that when the wire extending between two coils is cut at the position shown in Fig. 10, each coil leg has a given predetermined length. The mandrel holders 81 hold the mandrels 40 in conical seats (see Fig. 4) in firm and proper position with respect to the coiling head A. A small hole 86 in the holder 81 is used for the purpose of removing the shank 85 from its seat by the insertion of a pin or any suitable tool.

The mandrels may be made of spring steel wire such as piano wire of the proper diameter and may be inserted into the ends of the shanks or chucks 85. These chucks may have bores proportioned to tightly fit the inserted ends of the mandrels.

The other ends of the mandrel holders 81 are provided with mushroom caps 87 which, at their pointed outer ends ride part of the time upon a stationary cam 88, which latter is attached by screws to a block 89 secured to the base plate 10.

The mandrel holders are kept from moving freely by a plurality of friction spring leaves 90. These leaves 90 form a cup and have a common base flange secured to the inner wall of the drum 75 by screws 92.

In accordance with the present construction, as will be later explained, it is necessary to retract the mandrel holders to return them from the forward positions to which they are moved by the cam 88. Means for retracting the mandrels comprise a slide block 93 including a bushing 94 held firmly to the block by a screw 95, the block being slidable on shaft 70. The bushing is provided with a collar 97 and forms, in conjunction with the block 93, an annular groove 96. A rocker arm 98, pivoted at 99 has one end 100 forked in form and is provided with two rollers 101 disposed in and freely movable in the annular groove 6. An extension 102 of rectangular form projects from the forked end 100 into the groove 96 midway between the two rollers 101. Two pins 103 and 104, secured to one end of the slide block 93 and bushing 94 prevent the block from rotating around its axis (see Fig. 9).

The other end of slide block 93 has a flange 105 extending upwardly, upon which is fastened a member 106. This member has five extensions of equal size. Each extension is in a different relative position and serves to move or retract a mandrel holder. These extensions may be termed mandrel retractors and are indicated by the reference numerals 107, 107', 107², 107³ and 107⁴. The purpose and operation of these retractors will be more clearly described hereinafter.

For the purpose of actuating the retractor members a cam follower 110 is provided at the other end of the rocker arm 98 and positioned to ride upon a cam 111 secured to shaft C. The cam follower is held in constant contact with the face of the cam by means of a spiral spring 112, fastened on one end to the rocker arm 98 and anchored at the other end to a stationary stud 113.

The mandrel assembly or drum B is rotated about its horizontal axis in a series of intermittent movements and for this purpose a pawl and ratchet mechanism 115 is provided. (See Figs. 2, 4 and 8). This mechanism comprises a ratchet wheel 116, keyed to shaft 70 and lever arm 117 having one end freely pivoted on shaft 70 and held in place by a set ring 118. A pawl 119 pivoted to the lever arm 117 by means of a bolt 120, carries a lift pin 121 to ride upon a cam surface 122 of a cam 123. The cam 123 is adjustably attached by a set screw 124 to the bearing 72, as seen in Fig. 4. A link 125 is pivotally and adjustably attached at 125' to the outer end of lever arm 117. The opposite end of the link 125 is also pivotally and adjustably attached by wrist pin 126' off center on a disk 126, secured to one end of shaft C.

After a series of coils has been wound it is necessary to cut the filament wire between the two first wound coils. The cutting operation is accomplished by shearing means including cutting knives 127 and 127' of the disk type adjustably attached to lever arms 128 and 128'. These arms are secured to the ends of shafts 129 and 130 respectively and are rotatable in a bearing bracket 131 which is suitably secured to base plate 10.

On shafts 129 and 130 are pinions 132 and 132' disposed in mesh and secured to the shafts by set screws. Shaft 129 is longer than shaft 130 and has a rocker member 133 attached on its extended end, which end is also journalled in a bearing bracket 131. The rocker-member 133 is secured to shaft 129 and an arm 134 thereof is positioned to ride on a cam 135, which governs the cutting operation. The rocker-member 133 is also provided with another arm 136 held under the tension of a spring 137, thus holding the arm 134 against cam 135. (See Figs. 2 and 10).

It will be evident from the drawings that cam 135 will partially rotate the shaft 129 and, by reason of pinions 132 and 132' the knives 127 and 127' will operate to perform a shearing operation. The shape of the cam 135 causes a rapid or instant cutting action and a relatively quick opening of the knives 127 after cutting. The mechanism is so timed and arranged that the cutting operation does not interfere with the movement of other machine elements.

After a coil is cut it drops into a receiving funnel 140 which guides the finished coils from the machine as they are removed from their mandrels by stripper members or ejector springs 141, as the mandrel drum 73 indexes. (See Figs. 4, 10 and 11). The funnel 140 is suitably attached to the base plate 10 near the lower side of the mandrel drum 73.

For the purpose of preventing the mandrel drum from slipping, a brake mechanism 142 is provided. This brake comprises a lever 143 hinged at a midpoint on a bearing 144. Adjusting screws 145 are provided to regulate the pressure applied by a friction block 146 which engages the outer circumferential wall of the drum.

Fig. 12 diagrammatically illustrates the different steps in the coiling operations and shows the wire spool 11 from which the wire unreels over the idler pulleys 49 and 50 to a mandrel 40. In Fig. 12 the coiling operation on the mandrel adjacent to the coiling head is shown as about half-way finished. The coiling is accomplished by a rotation of the coiling head A at a predetermined speed and at the same time by a movement of the head away from the mandrel in order to obtain the required number of convolutions per inch, this movement being attained by the cam 26. When winding the wire, the ledge 43 on the shaft 40' engages the wire and carries it about the mandrel as the wire is fed from the spool. Hollow end 39 of shaft 38 receives the end of the mandrel and keeps it properly aligned, preventing any vibration or distortion.

The number of convolutions of the coil is obtained by the change gear assembly which drives hollow shaft 19 and with it the coiling head A, whereas the number of convolutions per inch i. e., the length of the coil, is controlled by the change gear assembly, which drives shaft 27. The shaft 27, which carries worm wheel 26, as above pointed out, makes one revolution for each complete coil winding operation. The pitch of worm wheel 26, therefore, corresponds with the length of one coil having a number of turns depending on the change gear employed. The entire change gear assembly, therefore, operates in unison and comes to rest immediately after the coil is finished. During this rest period, the locking or starting plate 66 engages locking member 67, and therefore, locks the entire change gear assembly.

When this locking takes place the coiling head A has fully cleared the mandrel 40, so that at the next operation, which is the indexing operation of mandrel drum B, the mandrel 40 with a wound coil therein will be moved one position to the right and with it the wire, thus obtaining the desired straight leg of the coil which is at right angles to its axis. The length of this leg, as already mentioned, measures exactly two legs or terminals of a finished coil, the straight or uncoiled portion of wire being severed midway between its connecting coils.

A new mandrel is then moved to position above the straight extending portion of the wire and in proper alignment with the coiling head A by means of stationary cam 88, as shown. The coils are then in a position as seen by the dotted lines in Fig. 12 and the new mandrel ready for the next coiling operation. The mandrel assembly drum or carrier may be rotated in a series of intermittent movements by any suitable means and in the present construction this is accomplished by ratchet mechanism indicated as a whole by the numeral 115 operated by a link 125 and disk 126 attached to the main drive shaft C.

Before each coiling operation it is necessary to move the coiling head with the wire into starting position in the direction of arrow G (see Figs. 5 and 12) by means of the rocker arm 34 which is actuated by the cam 36 on the main drive shaft C. The circular opening or notch 29 of worm wheel 26 is then at the top in rest position, thus allowing a movement of the forked end of rocker arm 34 in a direction opposite to that indicated by arrow X in Fig. 5.

This arm then engages set ring 32 and moves hollow shaft 19, shaft 38 and coil winding head A along a distance equal to approximately one coil length. At the same time yoke member 106 moves mandrels on which coils have been wound. This yoke member has five extensions 107, 107', $107^2$, $107^3$ and $107^4$ in stepped relation. This yoke, by means of the extensions, moves the mandrel holders with their respective coils one coil length away from the coiling head, thus forming a staggered arrangement with the coils still connected together so that each coil holds the adjacent coil as firmly as if held in a chuck. Yoke member 106, after the completion of this operation, returns immediately to its former position. At this time the locking and starting plate 66 causes the teeth of gear segment 54 to engage with the main gear 53, which sets the whole change gear assembly into operation, to begin the winding of the next coil upon a newly positioned mandrel.

The cutting or severing operation is performed between coils F—1 and F—2 (See Fig. 12) at about the same time when the sixth coil is about one-third completed. The cutting knives 127 and 127' separate the sixth coil or the first coil formed from the string of coils by a rapid action of the knives operated by the cam 135 on the drive shaft C as previously mentioned. The knives are again quickly opened so as to make room for the next indexing in order to freely pass the mandrels with the coils thereon.

The stationary cam 88 advances the mandrel holders gradually and the finished coils are removed by the ejector fingers 141 and are then dropped into the receiving funnel 140 from which they may be fed to a mounting or other machine. As the coil is cut at H (see Fig 12) the one freed leg of the previous coil will snap back one hundred and eighty degrees due to its resilient force, so that it is in the same direction as the long leg not as yet severed. The coils also widen in their diameter to such an extent as to correspond exactly to the required dimension and by reason of their slight increase in diameter may easily be removed from the mandrels.

In operation a spool of wire is applied to the winding head A, the wire is lead over guide pulleys 49 and 50 and the end of the wire is then held or given a few turns about a mandrel 40 which is positioned for a coil winding operation.

The machine is then put into operation and the motor, through the agency of the belt 13, translates motion to worm shaft 60, worm 59 and thence through worm wheel 58 to the main driving shaft C. This main driving shaft, by means of the change gears, transmit motion to coil winding shaft 19 and coil length control shaft 27. This shaft C also operates the mandrel drum intermittently by means of link 125. As above pointed out the mandrel drum is equipped with fifty-four mandrels and each mandrel is held at one end of a slidable holder. The mandrels slide endwise relative to the drum and, as the drum rotates to bring a mandrel into coil winding position, the holder is thrust forward by cam 88 to project the mandrel from the drum.

In the present construction each mandrel is moved a distance equal to five coil lengths so that it may be returned in five successive steps, each return or retracted movement being equal to a coil length. The forward movement of the mandrel is effected to bring it free from the adjacent mandrels to permit the coil winding head to operate. It has been found that by reason of the present construction the distance necessary for the mandrel to project is, as above mentioned, equal to five coil lengths. However, a machine may be made to operate in which the mandrels need only be moved one or two coil lengths. The present method of winding requires one coil to hold the other to keep the terminals straight for cutting and for positioning but it is not dependent on any given number of connected coils made in a series.

As will be seen from the drawings (see Fig. 12) each coil is connected at one end to another coil by a straight section of wire and at its other end to another coil by a straight section of wire. It is, therefore, necessary to keep coils in the same fixed relation. For this purpose means in the form of the retractor fingers 107 to $107^4$ are provided. These fingers move as a unit to retract all the mandrels a given distance each time.

Each holder, upon which a coil has been wound, is retracted after the coiling operation until the mandrels take the positions shown in Fig. 12. In the present machine the winding of five coils allows free movement for the other operating parts although as hereinabove pointed out, a series including a greater or lesser number of coils may be employed.

When a mandrel has moved out of coiling position the wire leading to the coil winding head is pulled out straight and the next mandrel positioned for a coiling operation is disposed across and above the extending wire. The shaft 19 then rotates and the ledge 43 on the stub shaft 40' carries the wire around the mandrel. As the winding continues the winding shaft 19 is fed in the direction of the arrow X, a given distance by means of the cam element 26. When the cam 26 has completed a revolution, the notch 29 is positioned to permit the shaft 19 to be returned by means of the rocker arm 34 which is actuated by cam 36 on the main driving shaft C.

Assuming that five coils have been wound and another coil is being wound, as shown in Fig. 12, the mandrel holders 81 of these wound coils will then be positioned to be retracted. The rocker arm 98, actuated by cam 111 on shaft C moves the retractor fingers 107, 107', $107^2$, $107^3$, and $107^4$ to retract each holder the specified distance. The first wound coil F—1 will then be in its final retracted or normal position. The second wound coil F—2 will be in the position shown, and connected to coil F—1 by a straight portion S indicated in dotted lines.

The cutter knives 127 and 127' are then operated by means of rocker member 133 actuated by cam 135 on shaft C. The straight portion S has one end helically coiled on coil F—1 and the other end helically coiled on coil F—2. The tendency of the straight portion is to bend about coil F—2 and take a position substantially tangent to the surface of the helix.

Thus, when the knives shear portion S into equal portions S' and $S^2$, the portion S' will take the position shown on coil F—2 and the portion S', which is on coil F—1 and not under tension, will retain its relation to coil F—1 which is free on the mandrel. In other words, coil F—1 has expanded slightly and the straight ends hang down, as shown in Fig. 10, ready to be stripped off into chute 140 by means of stripper fingers 141. It has been found that coils may be made with their terminals always in substantially the same relation to the coiled section especially when using tungsten wire of a predetermined resiliency. As above mentioned, the attainment of this condition may be aided by varying the tension in winding.

After a coil is severed from the series the mandrel drum is moved about its shaft one position by means of the link 125 and ratchet and pawl 115. The link is actuated by a rotary movement of the shaft C. As the mandrel drum moves, the cam 88 puts a new mandrel in its forward position for a coil winding operation. The mandrels having coils wound thereon are, obviously, moved one position and the rocker-arm 98 is actuated to retract the holders of mandrels having wound coils thereon. It will be evident that the series of connected coils are retracted simultaneously so that their relative positions are not changed. When the mandrel drum moves one position the mandrel holder of coil F—5 is positioned to be moved by retractor 107 and mandrel holders of coils F—4, F—3, F—2 and F—1 are also positioned for simultaneous movement as above mentioned.

It will be evident that the present machine operates continuously and automatically to produce coiled sections having straight ends or terminals. By reason of the present method of holding, winding and shearing coils, the resultant coils are each provided with straight terminals disposed at right angles to the longitudinal axis of their coiled section. The said terminals of one coil are disposed in the same relative positions as the terminals of the following coil.

Although a preferred embodiment of the invention is shown and disclosed herein it is to be understood that modifications may be made therein without departing from the spirit and scope of the invention as set forth in the appended claims.

What is claimed:

1. A machine for winding a wire into helically coiled lamp filaments comprising a plurality of coil winding mandrels, means for winding a coil of wire on one mandrel, means for terminating the winding operation, means for changing the relative position of said coil-winding means and said coil-winding mandrel to produce a straight portion of wire, and means for actuating the coil winding means to wind another coil of said wire on another mandrel prior to severing the first coil from the supply wire.

2. A machine for winding a wire into a plurality of helical coils connected by straight portions of wire comprising coil winding means, means for supporting a plurality of mandrels, means for moving a mandrel to be wound by said coil winding means, means for moving said wound mandrel to stretch a straight portion of wire to another mandrel, and means for moving said other mandrel to be wound by said coil winding means.

3. A machine for winding a wire into a plurality of helical coils having straight terminals, comprising coil winding means, a plurality of mandrels, means for moving a mandrel into operative relation with said winding means, means for operating said winding means to wind a coil on said mandrel, means for moving said wound mandrel to stretch a straight portion of wire adjacent another mandrel, means for moving said other mandrel into operative relation with said winding means, means for operating said winding means to wind a coil on said last mentioned mandrel continuous with said straight portion, and means for severing said straight portion of wire intermediate said coils only after said last-mentioned coil is completely wound.

4. A machine for winding a wire into a plurality of helical coils having straight terminals, comprising a plurality of mandrels, a support for holding said mandrels for movement through a given path, coil winding means adjacent the path of movement of said mandrels, means for actuating said support to successively position said mandrels into operative relation to said coil winding means, and means for actuating said winding means to wind coils connected by straight portions on successively positioned mandrels.

5. A machine for winding a wire into a plurality of helical coils having straight terminals, comprising a plurality of mandrels, a carrier for said mandrels, coil winding means adjacent the path of movement of said carrier, means for actuating said carrier to successively position said mandrels into operative relation to said coil winding means, means for actuating said coil winding means to wind coils connected by straight portions on successively positioned mandrels, and means for subsequently severing said straight portions to separate said coils.

6. A machine for winding helically coiled filaments having straight terminal portions substantially at right angles to the longitudinal axis of said filament coils, comprising a plurality of mandrels, means for winding a helical coil on one of said mandrels, means for moving said wound mandrel a given distance from said winding means causing a straight portion of wire to extend from said wound coil, means for positioning another mandrel for a coil winding operation, and means for winding the wire on said last mentioned mandrel to produce another coil connected to said first coil by the straight portion of wire.

7. A machine for winding helically coiled filaments having straight terminal portions comprising a plurality of mandrels, means for winding a helical coil on one of said mandrels, means for moving said wound mandrel a given distance from said winding means causing a straight portion of wire to extend from said wound coil, means for positioning another mandrel for a coil winding operation, means for winding the wire on said last mentioned mandrel, to produce another coil connected by said straight portion to said first coil, and means for subsequently severing said wire intermediate said mandrels.

8. A machine for winding coiled filaments with straight terminals, comprising a plurality of mandrels, a winding head, means for feeding a continuous wire to said head, means for winding said wire on a mandrel, means for moving said wire wound mandrel a given distance from said head to cause a straight portion of wire to extend from said wire wound mandrel, means for moving another mandrel adjacent to said head, means for operating said head to wind a coil about said last positioned mandrel, said coil being continuous with said straight portion, means for moving said last wound mandrel a given distance from said head to produce a straight portion, means for moving another mandrel adjacent to said head and means for operating said head to wind a coil about said last mentioned mandrel, said coil being continuous with said second mentioned coil.

9. A machine for winding coiled filaments with straight terminals, comprising a plurality of mandrels, a winding head, means for feeding a continuous wire to said head, means for winding said wire on a mandrel, means for moving said wire wound mandrel a given distance from said head to cause a straight portion of wire to extend from said wire wound mandrel, means for moving another mandrel adjacent to said head, means for operating said head to wind a coil about said last positioned mandrel, said coil being continuous with said straight portion, means for moving said last wound mandrel a given distance from said head to produce a straight portion, means for moving another mandrel adjacent to said head, means for operating said head to wind a coil about said last mentioned mandrel, said coil being continuous with said second mentioned coil and means for severing the straight portion of wire between said first and second wound coils.

10. A machine for winding helically coiled filaments comprising a coil winding head, a carrier, a plurality of mandrels, holders for said mandrels slidable in said carrier, means for intermittently moving said carrier to position each of said mandrels successively adjacent to said head for a coil winding operation, means for moving said holders to position said mandrels in coil winding relation to said head for the winding of a coil thereon during each stationary period of said carrier.

11. A machine for winding helically coiled filaments having straight terminal portions comprising a plurality of mandrels, a carrier for said mandrels, a coil winding head, means for feeding filament wire to said head, means for moving said carrier to position a mandrel for a coil winding operation, means for operating said head to wind a coil on said mandrel, means for moving said wound mandrel away from said head causing a straight portion of wire to extend from said wound mandrel substantially at right angles to the axis of said coil, means for moving said carrier to position another mandrel for a coil winding operation, and means for operating said head to wind a coil on said other mandrel connected to said first coil by said straight portion.

12. A machine for winding helically coiled filaments having straight terminal portions comprising a plurality of mandrels, a carrier for said mandrels, a coil winding head, means for feeding filament wire to said head, means for moving said carrier to position a mandrel for a winding operation to produce a coil on said mandrel, means for moving said wound mandrel away from said head causing a straight portion of wire to extend from the coil on said wound mandrel, means for moving said carrier to position another mandrel for a coil winding operation to produce another coil continuous with said straight portion, and means for severing the straight portions between said mandrels after the formation of said second coil.

13. A machine for winding helically coiled filaments having straight terminal portions comprising a plurality of mandrels, a carrier for said mandrels, a coil winding head, means for feeding filament wire to said head, means for moving said carrier to position a mandrel for a winding operation to produce a coil on said mandrel, means for moving said wound mandrel away from said head causing a straight portion of wire to extend from the coil on said wound mandrel, means for moving said carrier to position another mandrel for a coil winding operation to produce another coil continuous with said straight portion, means for severing the straight portion between said mandrels after the formation of said second coil, and means for removing said first coil from its mandrel.

14. A machine for winding helically coiled sections of wire having straight terminal portions comprising a cylindrical drum, a plurality of mandrels arranged in spaced relation around and adjacent to the outer surface of said drum, a coil winding head positioned adjacent to the path of movement of mandrels carried by said drum, means for rotating said drum to position a mandrel in operative relation to said coil winding head, means for moving a mandrel into coil winding position, means for operating said head to wind a coil on said positioned mandrel, means for moving said drum to position a second mandrel adjacent to said head causing the wire to extend in the form of a straight portion from said coil to said head, means for moving said second mandrel into coil winding position, means for operating said head to wind a coil on said second mandrel, means for partially retracting said first wound mandrel, means for moving said drum to position a third mandrel adjacent to said coil winding head, causing the wire to extend in a straight portion from said second wound coil, means for moving said third mandrel into coil winding position, means for operating said head to wind a coil on said third mandrel, and means for partially retracting said first and second wound mandrels, said machine operating to successively wind coils on mandrels until the first wound mandrel has been retracted to its normal position.

15. A machine for winding helically coiled sections of wire having straight terminal portions comprising a cylindrical drum, a plurality of mandrels arranged in spaced relation around and adjacent to the outer surface of said drum, a coil winding head positioned adjacent to the path of movement of mandrels carried by said drum, means for rotating said drum to position a mandrel in operative relation to said coil winding head, means for moving a mandrel into coil winding position, means for operating said head to wind a coil on said positioned mandrel, means for moving said drum to position a second mandrel adjacent to said head causing the wire to extend in the form of a straight portion from said coil to said head, means for moving said second mandrel into coil winding position, means for operating said head to wind a coil in said second mandrel, means for partially retracting said first wound mandrel, means for moving said drum to position a third mandrel adjacent to said coil winding head causing the wire to extend in a straight portion from said second wound coil, means for moving said third mandrel into coil winding position, means for operating said head to wind a coil on said third mandrel, means for partially retracting said first and second wound mandrels, said machine operating to successively wind coils on mandrels until the first wound mandrel has been retracted to its normal position, and means for severing the straight portions of wire between said mandrels.

16. A machine for winding helically coiled sections of wire having straight terminal portions comprising a cylindrical drum, a plurality of mandrels arranged in spaced relation around and adjacent to the outer surface of said drum, a coil winding head positioned adjacent to the path of movement of mandrels carried by said drum, means for rotating said drum to position a mandrel in operative relation to said coil winding head, means for moving a mandrel into coil winding position, means for operating said head to wind a coil on said positioned mandrel, means for moving said drum to position a second mandrel adjacent to said head causing the wire to extend in the form of a straight portion from said coil to said head, means for moving said second mandrel into coil winding position, means for operating said head to wind a coil in said second mandrel, means for partially retracting said first wound mandrel, means for moving said drum to position a third mandrel adjacent to said coil winding head causing the wire to extend in a straight portion from said second wound coil, means for moving said third mandrel into coil winding position, means for operating said head to wind a coil on said third mandrel, means for partially retracting said first and second wound mandrels, said machine operating to successively wind coils on mandrels until the first wound mandrel has been retracted to its normal position, and means for successively severing said coils and removing said severed coils from said mandrels.

17. The method of winding helically coiled sections of wire which comprises winding said wire helically about a mandrel and utilizing said wound coil to hold the wire taut during the winding of another coil continuous with said first coil about another mandrel.

18. The method of winding helically-coiled sections of wire which comprises winding one coiled section on a mandrel, stretching the wire leading from the said section to another mandrel, winding the wire on said second mandrel while utilizing the previously wound coil to hold the wire taut during the winding of said second coil.

19. The method of winding a wire into helically coiled sections having straight terminal portions which comprises winding a helically coiled section of said wire on a mandrel, stretching a continuous straight portion of the wire to another mandrel, winding a helically coiled section on said other mandrel, and severing the straight portion intermediate said coiled sections after winding the second section.

20. The method of winding a wire into helically coiled sections having straight terminal portions which comprises winding a helical section on one mandrel, utilizing said mandrel wound wire to hold the wire taut while stretching a straight portion of the wire to another mandrel, winding the wire into a helically coiled section on said other mandrel and in severing the wire intermediate said mandrels after the second winding operation.

21. The method of winding helically coiled sections of wire which comprises positioning a mandrel axially in registration with a coiling head, rotating said head, while simultaneously moving it axially away from said mandrel, in order to wind a coil of the desired pitch on said mandrel, stopping said head, moving said mandrel circumferentially and axially away from said head to draw a straight portion of wire from said head, while simultaneously moving a second mandrel axially toward, and circumferentially into alignment with said head, moving said head axially to initial position in registration with said second mandrel, and again rotating it, while simultaneously moving it axially away from said mandrel, to wind another coil, while the first coil serves to hold the wire taut for the winding operation on the second mandrel, and finally separating the coils by severing the straight portion therebetween.

22. The method of operating a series of mandrels comprising moving each mandrel, one at a time, first in one direction axially to position it for having a coil of wire wound thereon, then circumferentially, and axially in the opposite direction, to withdraw it from the coil winding position and carry a straight portion of the wire to be wound about a newly positioned second mandrel, moving said first and second mandrels circumferentially and axially away from the coil winding position, to carry a straight portion of the wire to be wound about a newly positioned third mandrel, and finally separating the coils by severing the straight portions between the mandrels in the order of winding, after the first of the mandrels, from which a coil is to be removed, has reached the axial position which it occupied prior to movement to coil-winding position.

23. In combination, a carrier holding a plurality of mandrels disposed circumferentially therearound, and axially movable, means for moving said mandrels one by one axially and circumferentially to a coil-winding position, and means for moving said mandrels one by one, in steps, from said coil-winding position to said initial position, in order to wind a series of coils thereon in stepped relation, the inner end of the outermost coil being connected to the outer end of the next coil by a straight portion, which is eventually severed in order to separate said coils.

RAYMOND H. BEEBE.